United States Patent [19]

Kennedy et al.

[11] Patent Number: 5,664,699
[45] Date of Patent: Sep. 9, 1997

[54] CORE SAND PREPARATION APPARATUS

[75] Inventors: David O. Kennedy, Arlington Heights; Anthony J. Beyer, Elgin, both of Ill.

[73] Assignee: Simpson Technologies Corporation, Aurora, Ill.

[21] Appl. No.: 416,565

[22] Filed: Apr. 4, 1995

[51] Int. Cl.$^6$ ................................ B67D 5/08; B05D 3/00
[52] U.S. Cl. ........................... 222/56; 141/95; 141/198; 222/61; 222/64; 366/18; 366/19; 366/141
[58] Field of Search ........................ 222/56, 61, 64, 222/394; 141/95, 198; 73/290 R, 290 V; 366/17, 18, 19, 141, 152.1, 152.2, 152.6

[56] References Cited

U.S. PATENT DOCUMENTS

| | | | |
|---|---|---|---|
| 1,198,530 | 9/1916 | Droughton | 366/26 |
| 1,203,734 | 11/1916 | Heidland | 366/92 |
| 1,323,864 | 12/1919 | Human | 417/128 |
| 2,141,427 | 12/1938 | Bryant | 417/120 |
| 2,637,330 | 5/1953 | Webster | 134/182 |
| 3,005,417 | 10/1961 | Swaney | 417/125 |
| 3,556,682 | 1/1971 | Sakamoto et al. | 417/102 |
| 3,595,385 | 7/1971 | Duff | 209/1 |
| 3,719,214 | 3/1973 | Erndt | 141/51 |
| 3,861,830 | 1/1975 | Johnson | 417/149 |
| 3,905,586 | 9/1975 | Wall, Jr. | 366/18 |
| 3,938,673 | 2/1976 | Perry, Jr. | 366/18 X |
| 4,404,168 | 9/1983 | Baumberger | 422/119 |
| 4,439,110 | 3/1984 | Massaux | 417/129 |
| 4,459,028 | 7/1984 | Bruder et al. | 366/141 |
| 4,464,055 | 8/1984 | Mercatoris et al. | 366/26 |
| 4,580,699 | 4/1986 | Black et al. | 222/64 |
| 4,596,297 | 6/1986 | Skibinski | 177/132 |
| 4,812,047 | 3/1989 | Baumann | 366/141 |
| 4,828,461 | 5/1989 | Laempe | 417/132 |
| 4,881,819 | 11/1989 | Blees | 366/8 |
| 5,025,594 | 6/1991 | Dunnous | 222/56 |
| 5,044,819 | 9/1991 | Kilheffer et al. | 404/72 |
| 5,078,201 | 1/1992 | Nakamura | 164/155.7 |
| 5,105,661 | 4/1992 | Sekita et al. | 73/290 V |
| 5,121,990 | 6/1992 | Guiet et al. | 366/139 |
| 5,123,569 | 6/1992 | Lindner | 222/56 |
| 5,186,538 | 2/1993 | Ito et al. | 366/16 |

OTHER PUBLICATIONS

"REStech Volumetric Liquid Addition System," Control technology, Industrial Control Systems (Warsaw, IN), 1988.
Griffiths, J., "Developments in continuous sand mixers," Foundry Trade Journal: 68–74 (Feb. 1992).
"Ultrasonic Sensing/Control Is Our Only Busines," Migatron Corportion (Woodstock, Illinois), pp. 4–14, 1993.
"Smart Pump," MTSystems (Georgetown, Illinois).
"RL 50210 TA," Rice Lake Weighting Systems (Rice Lake, WI), 1993.
"Sand Mixing Unit," Core Production Equipment, LAEMPE GmbH (Schopfheim, Germany).

*Primary Examiner*—Kevin P. Shaver
*Attorney, Agent, or Firm*—Keck, Mahin & Cate

[57] ABSTRACT

A binder system component metering apparatus for use in core sand mixing equipment comprising an elongate hollow vessel of substantially greater length than width and having upper and lower end portions, valves located in a lower end portion of the elongate vessel for introducing via hydrostatic pressure, liquid binder system components into the vessel so that as the vessel is filled the liquid presents an upper surface that rises vertically, and a sensor located in the upper end portion of the elongate vessel to continuously sense the position of the liquid surface at infinite locations along the length of elongate vessel whereby the upper surface rises with minimum turbulence.

5 Claims, 4 Drawing Sheets

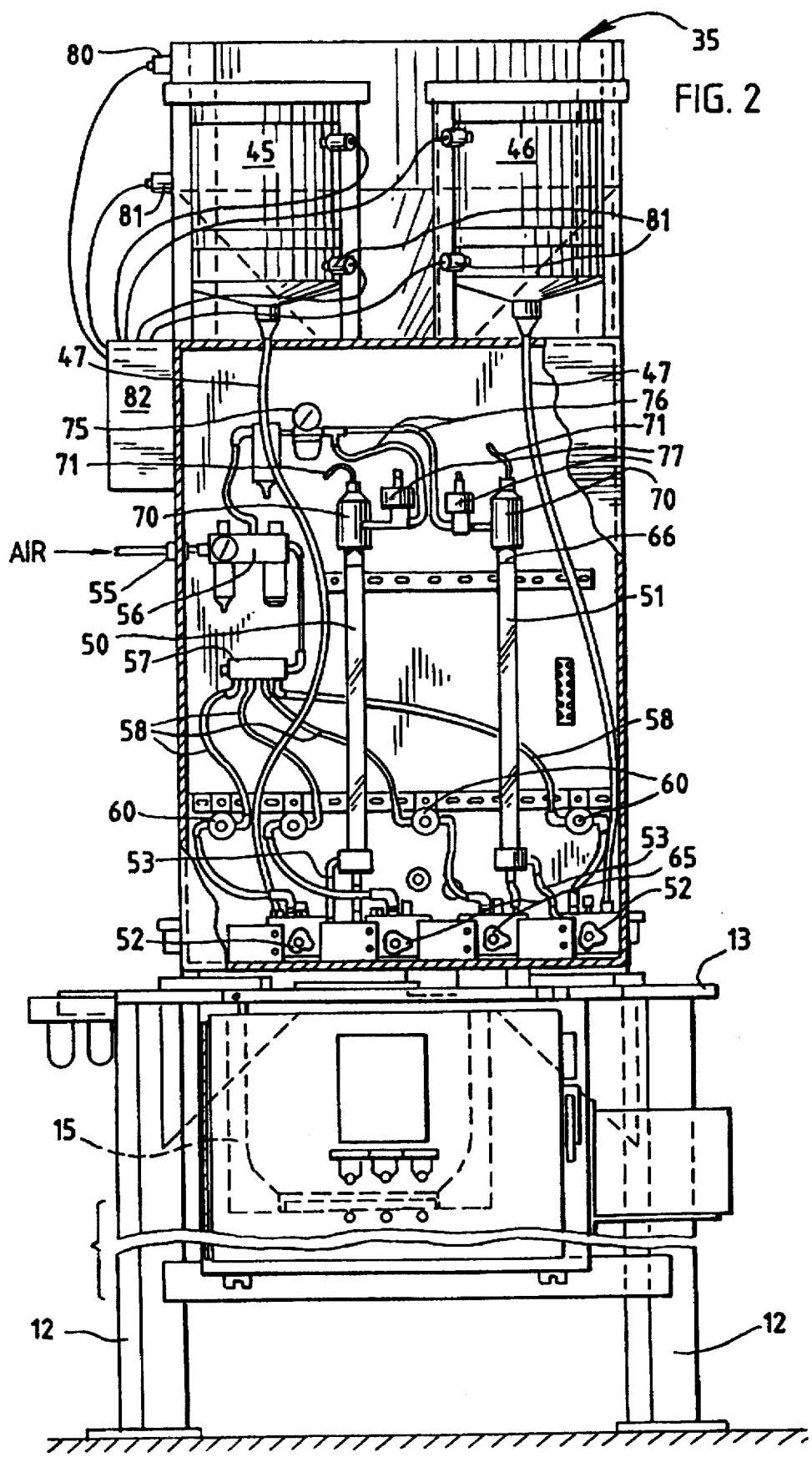

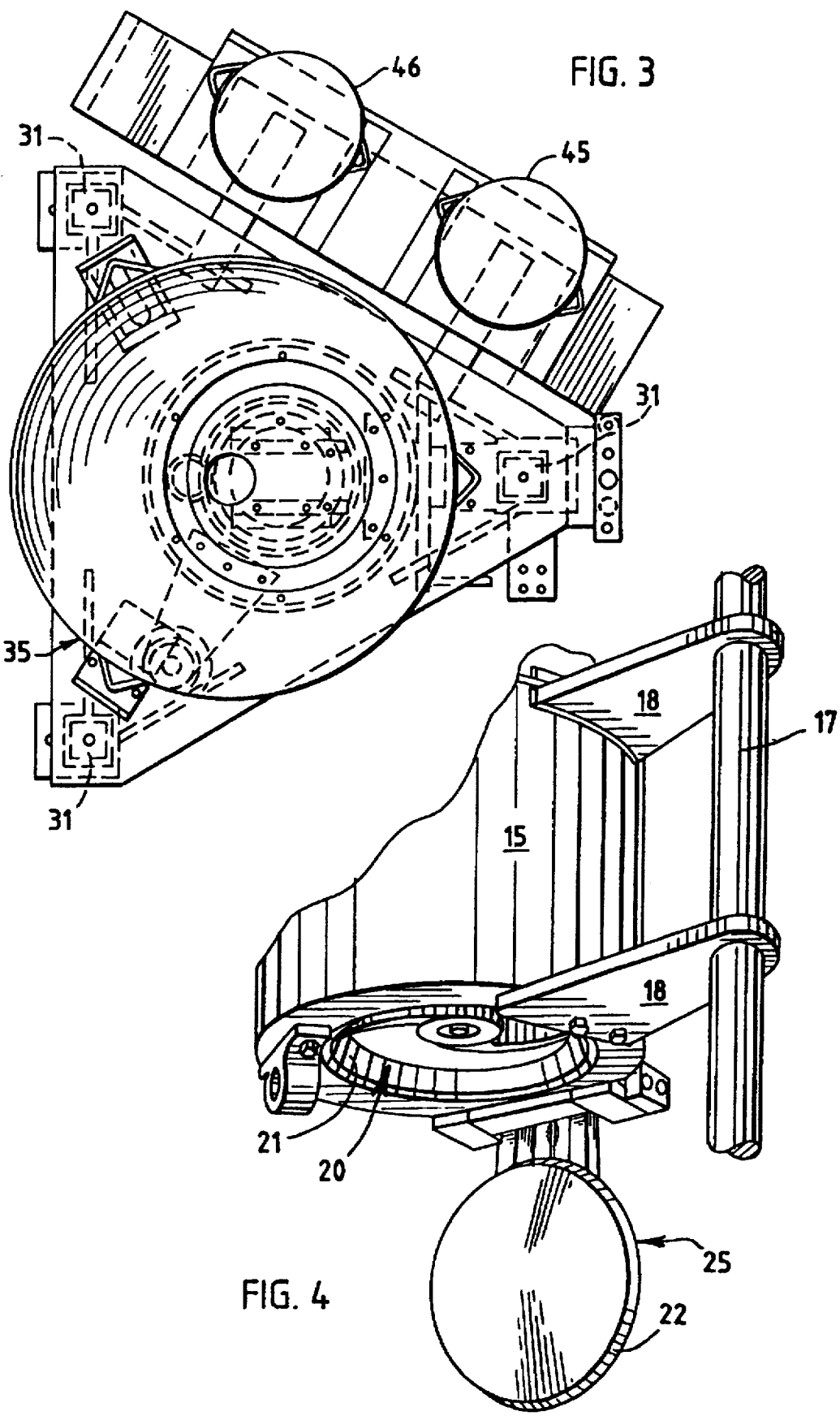

CORE SAND PREPARATION APPARATUS

FIELD OF THE INVENTION

The present invention relates to an improved apparatus for preparing core sand mixtures comprised of sand and sand binder systems and more particularly to such an apparatus that enables greater control of the quantities of the required basic ingredients than has previously been possible.

Metal foundries characteristically use sand molds for the production of castings from molten metal. Contemporaneous casting practices make use of core sands that are combined with various additives to achieve improved casting finishes and dimensions, among other things. One such practice involves the addition of a liquid binder system to the sand to assist in maintaining core integrity during the casting process. A variety of sands, and binder systems are known and used in everyday foundry operations.

Binder systems can include one or more liquid components. Commonly used core binder systems may have two liquid components, sometimes referred to as resin and catalyst, which are mixed with the raw core sand. This invention is illustrated with a two part liquid component binder system, but the invention is not limited by the number of liquid components in a given binder system.

It has become recognized that the ratio of sand to binder system is significant both as to the quality of the mold/core produced, as well as to the costs of production and quality of casting produced. Many binder systems are difficult to handle and process and, further, give rise to potential environmental considerations.

It is a principal object of the present invention to provide an improved apparatus for preparing accurately metered amounts of core sand, and binder system.

A further object of this invention is to provide an improved apparatus for preparing core sand-binder system mixtures that are accurately controlled as to the amounts of sand and binder system that are combined.

An additional object of this invention is to provide an improved apparatus for making core sands that has an improved sand mixing receptacle and mixing receptacle mount.

Still another object of this invention is to provide an improved core sand mixing apparatus having programmable control means that is responsive to system variables to provide greater control in additive accuracy.

These and other objects of this invention will be in part obvious and in part explained by reference to the accompanying specification and drawings, in which:

FIG. 2 is an elevational view similar to that of FIG. 1, showing a typical binder system metering apparatus of a two component liquid system;

FIG. 3 is a top plan view of FIG. 1;

FIG. 4 is a perspective view of a portion of the mixing vessel of the present invention.

SUMMARY OF INVENTION

Figure 1:
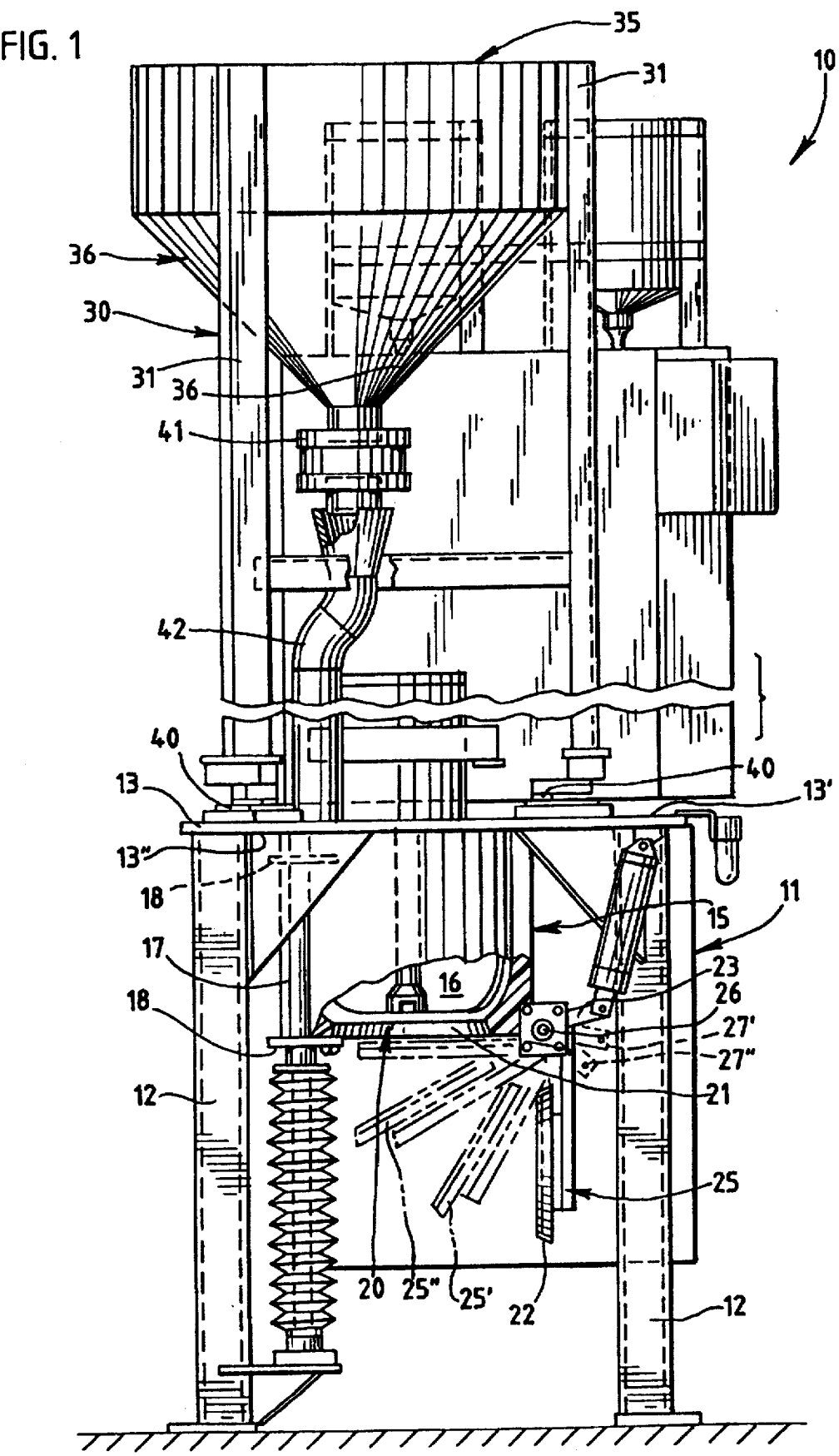
FIG. 1 is an elevational view showing the core sand mixing apparatus of this invention.

The core sand mixing apparatus of the present invention is comprised of four major subsystems, these being:

1. a main mixing frame made up of first and second frame units, together with a mixing chamber;
2. a sand metering and addition system;
3. a binder system components addition system; and
4. a control system.

The mixing frame is a welded fabrication constructed to allow the mixing chamber to be mounted to the bottom of a frame plate. The frame plate is a substantially horizontal plate that is located near the upper end of the first frame unit, this unit being the lower of the two which together comprise the mainframe.

The frame plate has upper and lower surfaces and the lower surface acts as a cover or seal for the mixing chamber. Apparatus is also contained within the first frame unit to allow for the mechanical lowering of the mixing vessel for ease of cleaning. The mixing chamber itself is made of a cast polyurethane compound which is essentially resistant to most all known chemically bonded sand binder systems. The chamber has a bottom steel reinforcement ring which is bonded in place to the urethane material during the casting process. This reinforcement ring is used to mount the hinge mechanism for the bottom door opening. The door itself is constructed of cast polyurethane, again with a steel reinforcement ring encapsulated to provide the support for mounting the door to the hinge mechanism.

The sealing surface on both the door opening in the bottom of the mixing chamber and the contoured surface on the door sealing surface are the cast polyurethane material. This provides a resilient sealing surface which due to its design is self-cleaning, in order to prevent sand from leaking from the mixing chamber during filling and mixing operations.

The sand addition system utilizes a batch type loss-in-weight load cell weighing mechanism. The sand system is mounted on the second frame structure and is positioned atop load cells that are disposed on the frame plate of the first structural unit. The sand system utilizes control means which allow for rapid filling of the mixing chamber to a point which is capable of being throttled to reduce the flow as the required amount of sand to be delivered is approached.

The binder system component metering system comprises generally elongate volumetric vessels having at the top sensors that are capable of identifying the vertical elevation of the surface of the liquid that is contained within the vessel. The addition system also utilizes in its operation a source of high pressure gas, normally air, which is used to expel the binder system components from the metering vessels into the mixing chamber.

Finally, the control system for the present core sand mixing system, which includes a programmable controller, ties all of the elements mentioned above together into a package which accurately controls mixing cycle sequence, sand addition and binder system component addition.

The present apparatus recognizes the importance of very accurate control of the binder system components and sand additions to the process. The accurate control provides for minimum use of the expensive binder system additives as well as consistent control of the mixed sand as the output of the system. The tighter control of binder system additions and sand addition provided by this invention permits addition of lower percentages of the binder system. The ability to use less of the binder system benefits the casting process by reducing the amount of scrap otherwise generated when excessive binder system levels in the cores are present, as well as the cost of the final casting.

DESCRIPTION OF THE PREFERRED EMBODIMENT

Turning to FIG. 1 of the drawings, numeral 10 indicates the overall core sand mixing apparatus of this invention. The general supporting structure includes a first supporting structure 11 that generally has three or four vertical legs 12 and a frameplate 13 that has upper and lower surfaces, 13' and 13", respectively. As shown the frameplate is located at the upper end of first supporting structure 11 and is supported by the legs 12.

A mixing vessel 15 which defines a mixing chamber 16 is located beneath frameplate 13 and is supported from the first supporting structure 11 by appropriate mechanical means. Specifically, the mixing vessel 15, which is here shown in a form of an open top bowl, is supported on a threaded support rod 17 that extends through a pair of ears 18 attached to the outside wall of the mixing vessel 15. This threaded mounting permits vessel 15 to be raised toward and away from the underside of frameplate 13 for cleaning purposes.

The bottom of mixing vessel 15 is provided with an opening 20 that is formed by an annular surface 21. This annular surface is profiled to cooperate with the annular surface 22 on door 25. The door 25 pivots on an axis 26 for rotation by lever 27 that is operated by cylinder and piston combination 28. Numerals 27', 27" illustrate the path of movement of lever 27. As shown in FIG. 1, the door 25 can be moved from the solid line position through the dotted line positions 25' and 25" to close the opening 20 during mixing operations and then reversed to open for discharge of mixture at the completion of a mixing operation. The underside of frameplate 13 is formed with an annular seal (not shown) that cooperates with the upper end or edge of vessel 15 so that when the vessel is moved by threaded rod 17 to its upper most position, the top of the vessel is sealed against the lower surface 13" of frameplate 13. The only openings into the top of the vessel are to permit the introduction of sand and of binder system components, so that the contents of the mixing vessel are substantially isolated from the environment during mixing operations.

A second supporting structure 30 is positioned on top of the frameplate 13 on first supporting structure 11. The basic framework of the second supporting structure comprises three legs, 31, between which at their upper ends is provided means for holding a quantity of sand. This means is shown in FIG. 1 as a hopper 35 having a downwardly sloping generally conically configured bottom portion 36. It is in this hopper 35 that sand is stored for use during mixing procedures. At the bottom of each leg 31 there is located a cantilever load cell 40 that is interposed between the bottom of legs 31 and the upper surface of frameplate 13, thereby supporting the entire weights of second supporting structure 30 and hopper 35. These load cells 40 produce electrical outputs which are proportional to the weight supported thereby and this can be used to identify change in weight of the sand contained within hopper 35. By detecting changes in the amount of sand in hopper 35, the variable output signals provide suitable control means to regulate with greater accuracy the quantity of sand that is dispensed into the mixing vessel 15.

Sand flow control and conducting means are provided which allow transfer of sand from the sand holding hopper 35 to the mixing chamber 16. Again as shown in FIG. 1, these means comprise a valve 41 which is associated with delivery tube 42 that transports sand between hopper 35 and mixing chamber 16. It is to be seen that while the weight of the hopper 35 (and its contents) is supported on load cells 40, the weight of the delivery tube 42 is supported on the frameplate 13 and not on load cells 40. Valve 41 is capable of altering the rate of flow of sand into the pipe 42 while flow is occurring. Specifically it permits maximum flow during the initial stages of transfer between hopper 35 and vessel 15, and then as the signals emanating from load cells 40 indicate that the transfer of the required degree of sand is being accomplished, the flow rate decreases prior to the complete closing of the valve; this action increases the level in accuracy of the quantity of sand delivered.

The present apparatus for the preparation of core sand mixtures also includes as a significant part, metering means for supplying accurate quantities of binder system components into the mixing vessel 15 for mixing with the sand. The liquid component metering means of this invention can best be seen by referring to FIG. 2 of the drawings. As seen in FIG. 2 there are binder system components supply vessels 45 and 46 which are located approximately at the same level as hopper 35 at the upper end of second supporting structure 30. The liquid component supply vessels 45 and 46 are not however supported on the second support structure 30 but are rather, through intermediate structure, supported directly on the frameplate 13 and first supporting structure 11. Each of the liquid component supply vessels 45 and 46 is connected by means of a fluid conducting conduit 47 to the bottom end of hollow vertical measuring vessels 50 and 51 of substantially greater length than width. These vessels 50 and 51, are connected at the lower ends to supply tubes 47 through air actuated valves 52 and connecting tubes 53. Operation of valves 52 for the purpose of filling metering vessels 50 and 51 with binder system components is effected by means of air from a high pressure source 55. The air 55 passes through regulator means 56, manifold 57 and a plurality of distribution tubes 58. Tubes 58 supply air to solenoid operated air valves 60 and finally to filling control valves 52 and emptying control valves 65. When filling of the tubes 50 and 51 with binder system components is being effected, each component presents an upper surface 66 which is present at basically an infinite number of locations along the height of each of the vessels 50 and 51 as they are being filled.

At the upper end of each of the metering tubes 50 and 51, is means for transmitting and receiving pulsed energy. These means are identified by the numeral 70 and they may advantageously be ultrasonic transducers. Obviously, other types of devices for transmitting pulsed energy can be used in place of ultrasonic transducers, although this is a preferred apparatus. Each of the transducers that is connected to controlling means to be described subsequently, as by means of electrical connectors 71. In addition, the upper end of each of the metering vessels 50 and 51 is connected to the source of high pressure of air 55 through a regulator 75, interconnecting air conduits 76 and air actuated valves 77.

Figure 5:
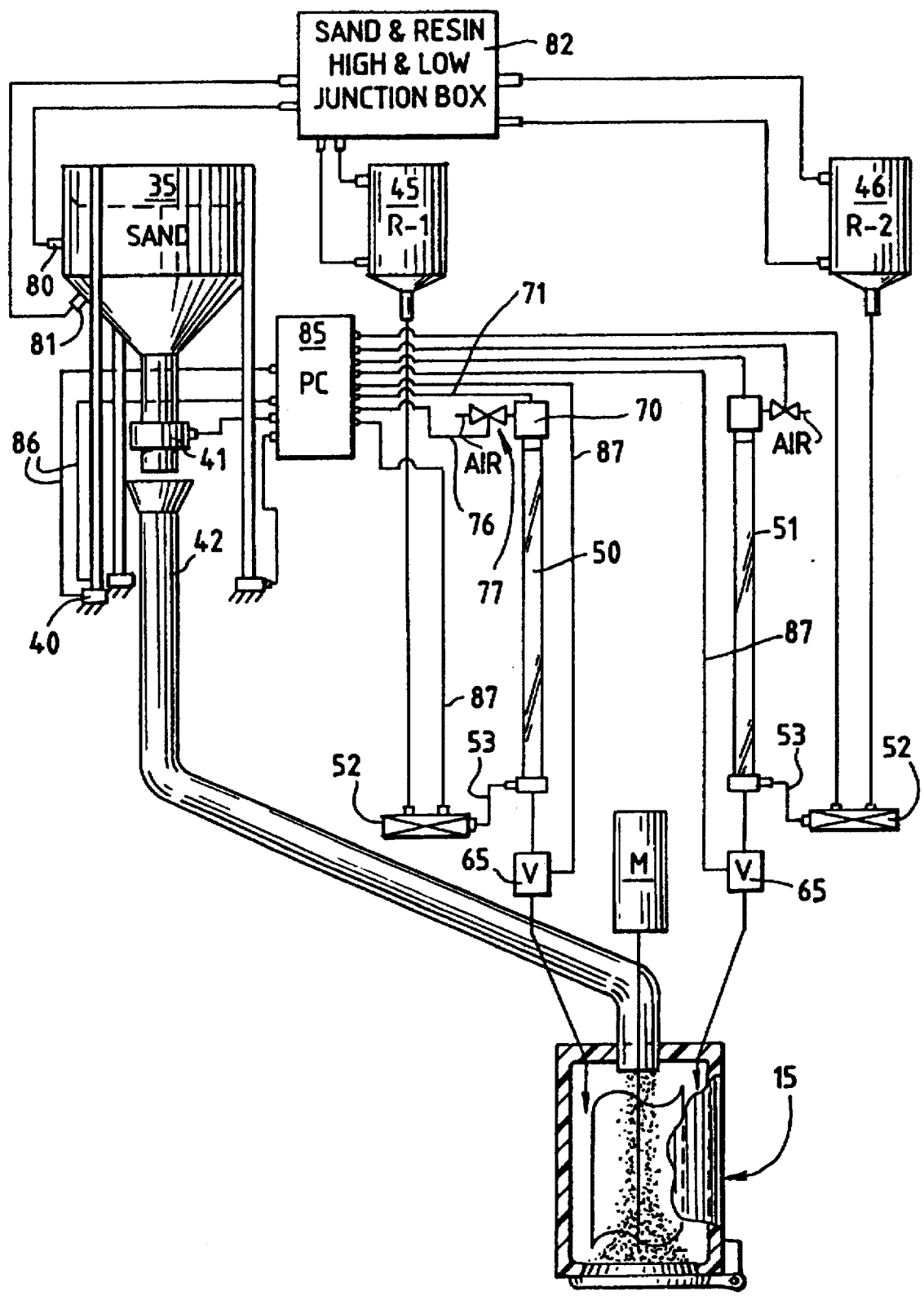
FIG. 5 is a schematic showing the control system of the invention.

The control system for the present core sand mixing system can best be understood by referring to FIG. 5 of the drawings. The control system ties all of the elements discussed previously into an integrated package which actively controls mixing cycle sequence, sand addition and binder system component addition. It is very important to the batching system process to accurately control the amount of binder system components and sand addition. As mentioned previously, accurate control provides for minimum use of the comparatively expensive binder system additives, as well as, consistent and accurate control of the mixed sand as an output of the system.

It will be seen that the sand hopper 35 and the binder system components supply vessels 45 and 46 each have high and low material quantities sensors 80 and 81 respectively. The purpose of these sensors is to identify when the quantity of sand and binder system components has dropped below a minimum desirable level so that renewed quantities of the raw material additives can be introduced into containers 35, 45 and 46. The sensors 80 and 81 are connected into a sand and binder high and low junction box 82 which performs the operation of receiving the signals from the sensors and activating appropriate means to insure that the raw materials are replenished when needed.

Integration in the operation of the various components of the sand core mixing apparatus is controlled by means of a suitable programmable logic controller 85. The controller 85 is connected to an operator interface to allow access to the appropriate registers to adjust the mixing process. As shown in FIG. 5, controller 85 is directly connected by leads 86 to the cantilever load cells 40. The valves 77 that control the supply of air to the top of metering vessels 50 and 51, and the valves 52 and 65 that provide for the introduction of binder system components into and from the metering chambers 50 and 51 are connected to PLC 85 by leads 87. The transducers 70 are connected to PLC 85 by leads 71.

In operation, the user of the apparatus introduces the necessary information into PLC 85 by means of a suitable user interface such as a keyboard. The information includes the amount of sand to be supplied from hopper 35 into vessel 15 as well as the quantities of binder system components that are to be added to the sand. Assuming that the metering vessels 50 and 51 are initially empty, the information stored would provide for the opening of the supply tubes 47 between binder system component liquid supply sources 45 and 46 and the bottom of each of the metering vessels 50 and 51. The flow from vessels 45 and 46 is solely hydrostatic pressure so that the surface 66 of the liquid binder system components being introduced into vessels 50 and 51 rises slowly without turbulence as fluid is introduced. Simultaneously, the pulsed energy means 70 located at the upper end of each vessel 50 and 51 continuously senses the position of the liquid surface at infinite locations along the vertical axes of the vessels 50 and 51. When the desired quantities of binder system component are determined to be present, controller 85 initiates opening of sand valve 41, closing of valves 52, opening valves 65 and the introduction of air into the upper ends of vessels 50, 51. Following introduction of accurately metered amounts of sand and binder system components into vessel 15, mixing is effected. Further batching operations can then be carried out as desired.

The above described embodiments are merely illustrative of the principles of this invention. Other arrangements and advantages may be devised by those skilled in the art without departing from the spirit and scope of the invention. Accordingly, the invention should be deemed not to be limited to the above detailed description but only by the spirit and scope of the claims which follow.

What is claimed is:

1. A binder system component metering apparatus for use in core sand mixing equipment comprising:

(a) an elongate hollow vessel of substantially greater length than width and having upper and lower end portions, (b) means located in a lower end portion of the elongate vessel for introducing via hydrostatic pressure, liquid binder system components into the vessel so that as the vessel is filled the liquid presents an upper surface that rises vertically, and (c) means located in the upper end portion of the elongate vessel to continuously sense the position of the liquid surface at infinite locations along the length of elongate vessel whereby the upper surface rises with minimum turbulence.

2. A metering apparatus as defined in claim 1 wherein means is provided in the upper end portion to introduce compressed gas into the elongate vessel above the liquid surface.

3. An apparatus as defined in claim 1 wherein the means for continuously sensing the vertical location of the liquid surface transmits energy pulses which strike the liquid surface and reflect therefrom for receival by the sensing means.

4. An apparatus as defined in claim 3 wherein the sensing means is an ultrasonic transducer.

5. An apparatus as defined in claim 3 wherein the pulsed energy is laser originated.

* * * * *